US012658532B2

(12) United States Patent
Son et al.

(10) Patent No.:  US 12,658,532 B2
(45) Date of Patent:      Jun. 16, 2026

(54) BATTERY CELL INCLUDING ELECTRODE TAB HAVING STRESS RELIEF PORTION

(71) Applicant: LG Energy Solution, Ltd., Seoul (KR)

(72) Inventors: Gil Sang Son, Daejeon (KR); Dong Yeon Kim, Daejeon (KR); Yong Tae Lee, Daejeon (KR); Dal Mo Kang, Daejeon (KR); Jung Koo Kang, Daejeon (KR); Myung Hoon Ko, Daejeon (KR); Jin Hak Kong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 773 days.

(21) Appl. No.: 17/914,978

(22) PCT Filed: Aug. 25, 2021

(86) PCT No.: PCT/KR2021/011360
§ 371 (c)(1),
(2) Date: Sep. 27, 2022

(87) PCT Pub. No.: WO2022/065708
PCT Pub. Date: Mar. 31, 2022

(65) Prior Publication Data
US 2023/0198106 A1      Jun. 22, 2023

(30) Foreign Application Priority Data
Sep. 28, 2020    (KR) ........................ 10-2020-0125806

(51) Int. Cl.
*H01M 50/533*      (2021.01)
*H01M 50/105*      (2021.01)
*H01M 50/178*      (2021.01)

(52) U.S. Cl.
CPC ....... *H01M 50/533* (2021.01); *H01M 50/105* (2021.01); *H01M 50/178* (2021.01)

(58) Field of Classification Search
CPC . H01M 50/533; H01M 50/178; H01M 50/105
See application file for complete search history.

(56) References Cited

U.S. PATENT DOCUMENTS

2010/0055558  A1     3/2010   Choi et al.
2010/0310930  A1*   12/2010   Park ..................... B32B 27/308
                                                          429/185
(Continued)

FOREIGN PATENT DOCUMENTS

CN          201562709 U       8/2010
CN          110462881 A      11/2019
(Continued)

OTHER PUBLICATIONS

Extended European Search Report including Written Opinion for Application No. 21872738.6 dated Aug. 21, 2024, pp. 1-9.
(Continued)

*Primary Examiner* — Kimberly Wyluda
(74) *Attorney, Agent, or Firm* — Lerner David LLP

(57) ABSTRACT

The present invention relates to a battery cell including an electrode assembly including a plurality of electrode plates and at least one separator interposed between the plurality of electrode plates, a case configured to receive the electrode assembly, electrode tabs formed at the electrode plates so as to protrude and extend therefrom, and an electrode lead joined to the electrode tabs while being electrically connected to the outside, wherein each of the electrode tabs includes a first tab portion connected to a corresponding one of the electrode plates and a second tab portion extending from the first tab portion, the electrode lead being joined to the second tab portion, and the first tab portion is provided with a stress relief portion configured to reduce stress in the electrode tab.

18 Claims, 4 Drawing Sheets

(56) References Cited

U.S. PATENT DOCUMENTS

| | | | |
|---|---|---|---|
| 2011/0129701 A1* | 6/2011 | Seo | H01M 50/54 |
| | | | 429/153 |
| 2011/0206976 A1 | 8/2011 | Yoo | |
| 2012/0052334 A1 | 3/2012 | Ryu et al. | |
| 2013/0157110 A1 | 6/2013 | Kanai et al. | |
| 2013/0196210 A1 | 8/2013 | Kim et al. | |
| 2013/0266845 A1 | 10/2013 | Kanda et al. | |
| 2014/0030579 A1 | 1/2014 | Kim et al. | |
| 2014/0193710 A1* | 7/2014 | Hasegawa | H01M 10/0585 |
| | | | 429/211 |
| 2015/0318534 A1 | 11/2015 | Yoo | |
| 2015/0372335 A1 | 12/2015 | Jung et al. | |
| 2017/0352858 A1 | 12/2017 | Park et al. | |
| 2018/0269458 A1 | 9/2018 | Oh et al. | |
| 2019/0386259 A1 | 12/2019 | Kim | |
| 2022/0255201 A1 | 8/2022 | Kim et al. | |

FOREIGN PATENT DOCUMENTS

| | | |
|---|---|---|
| JP | H11016577 A | 1/1999 |
| JP | 2012014935 A | 1/2012 |
| JP | 2012-048989 A | 3/2012 |
| JP | 2013073757 A | 4/2013 |
| JP | 2013214464 A | 10/2013 |
| JP | 2014022116 A | 2/2014 |
| JP | 2019061878 A | 4/2019 |
| KR | 100891078 B1 | 3/2009 |
| KR | 20110095819 A | 8/2011 |
| KR | 101282492 B1 | 7/2013 |
| KR | 20130108688 A | 10/2013 |
| KR | 20130119457 A | 10/2013 |
| KR | 20160092748 A | 8/2016 |
| KR | 101674264 B1 | 11/2016 |
| KR | 20170070401 A | 6/2017 |
| KR | 20190143407 A | 12/2019 |
| KR | 102092115 B1 | 4/2020 |
| KR | 102107000 B1 | 5/2020 |
| KR | 102125059 B1 | 6/2020 |

OTHER PUBLICATIONS

International Search Report for Application No. PCT/KR2021/011360 mailed Nov. 30, 2021, pp. 1-3.
Search Report dated Nov. 20, 2025 from the Office Action for Chinese Application No. 202180025454.2 issued Nov. 24, 2025, 2 pages.

* cited by examiner

【FIG. 1】
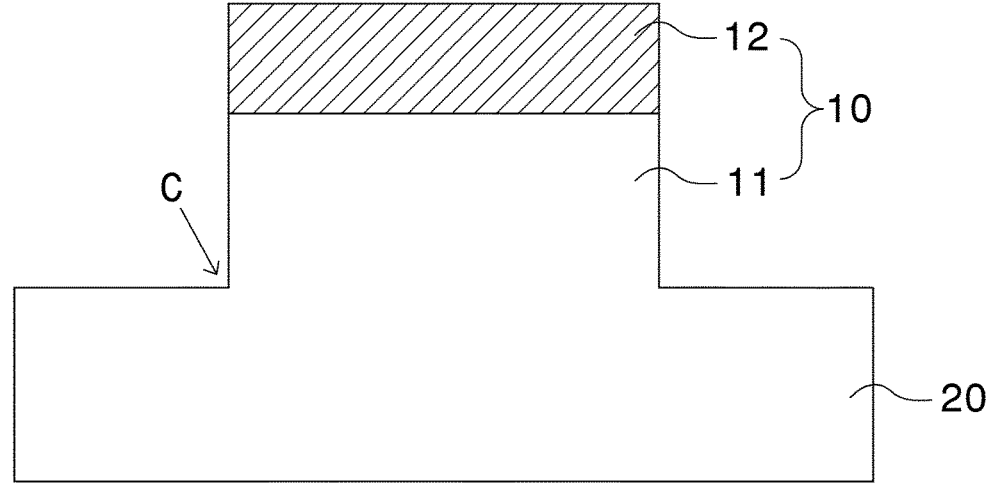
【FIG. 2】
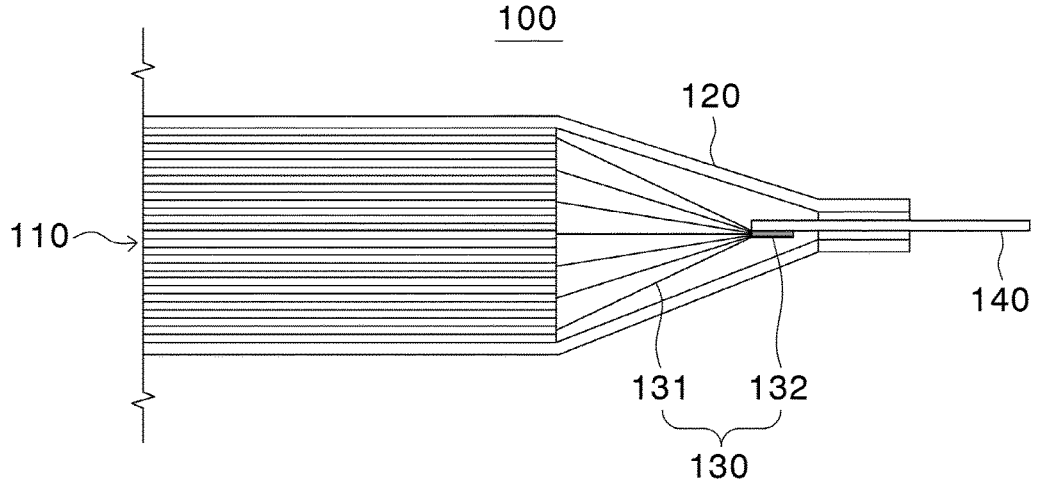

【FIG. 3】
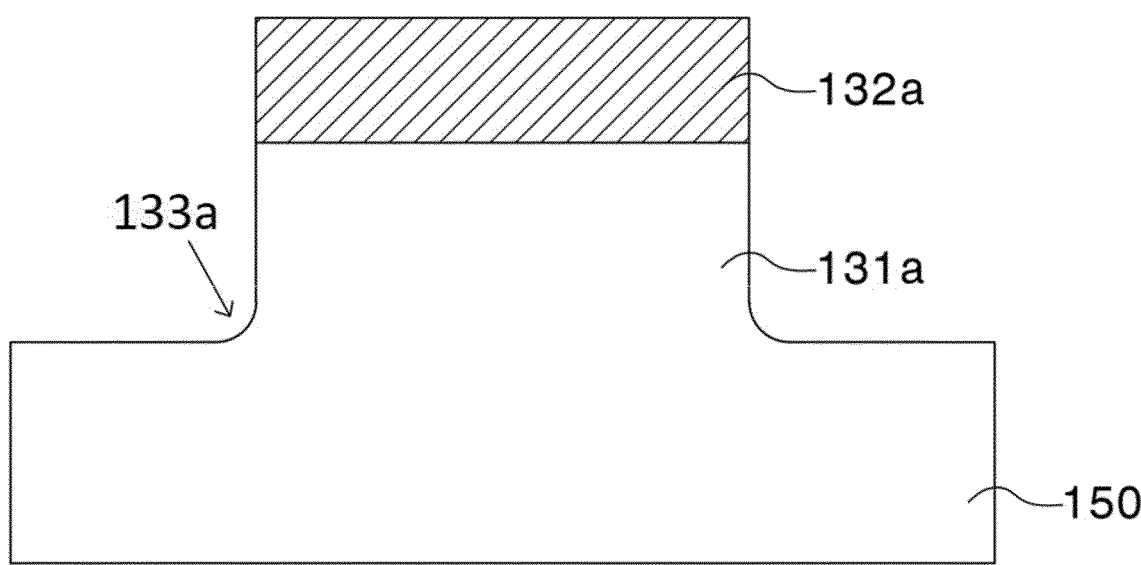
【FIG. 4】
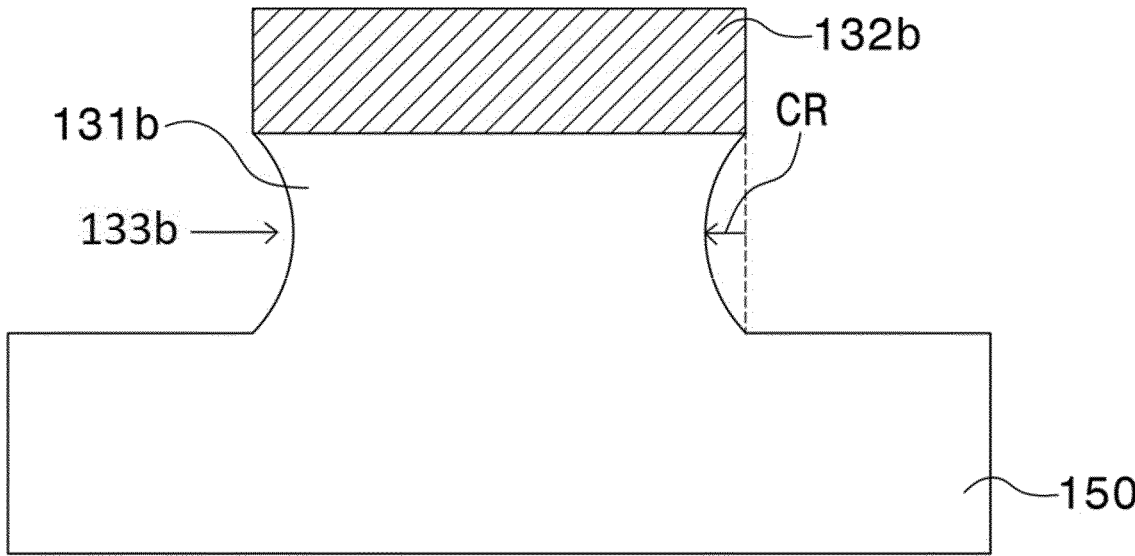

【FIG. 5】
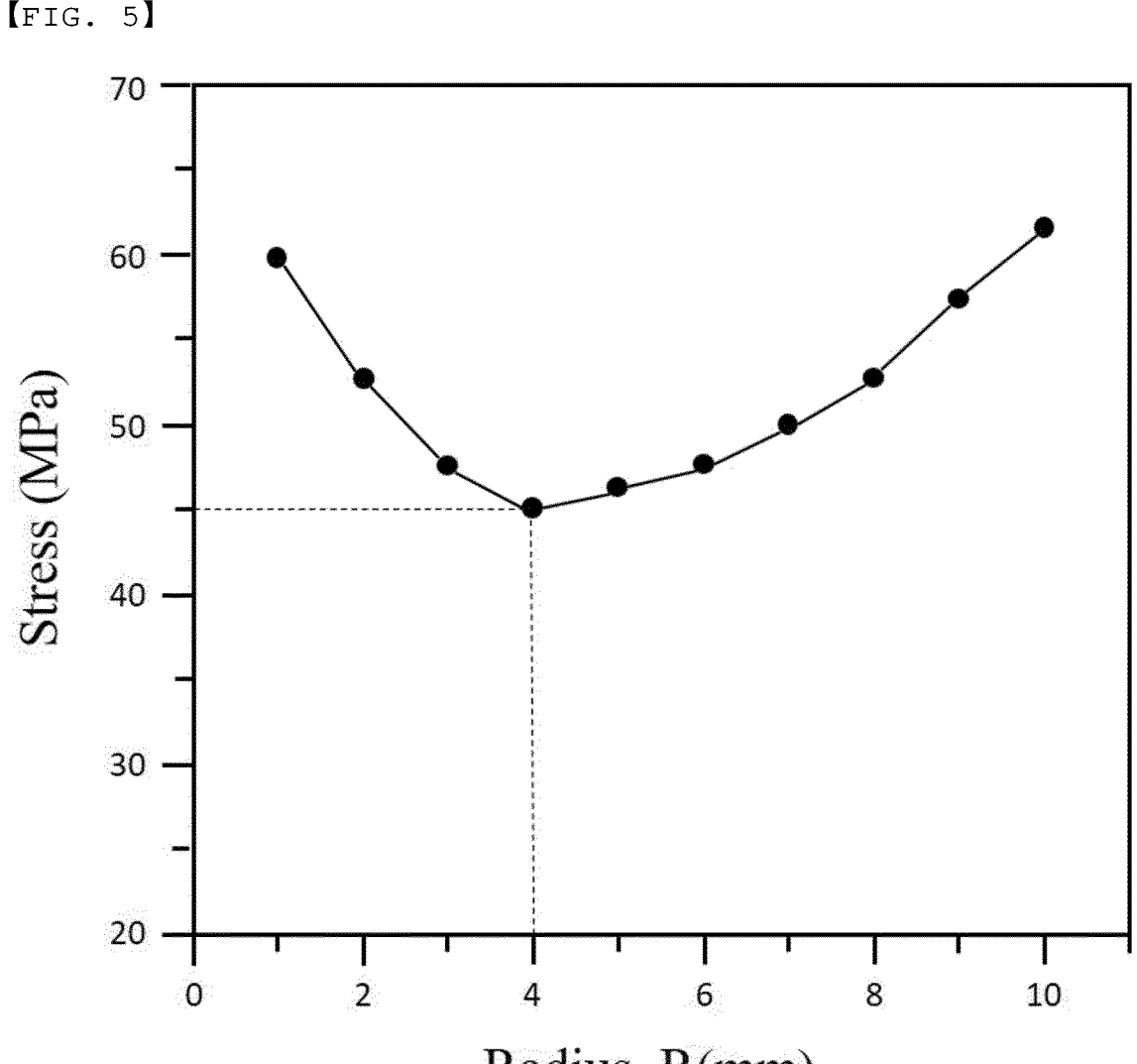

【FIG. 6】
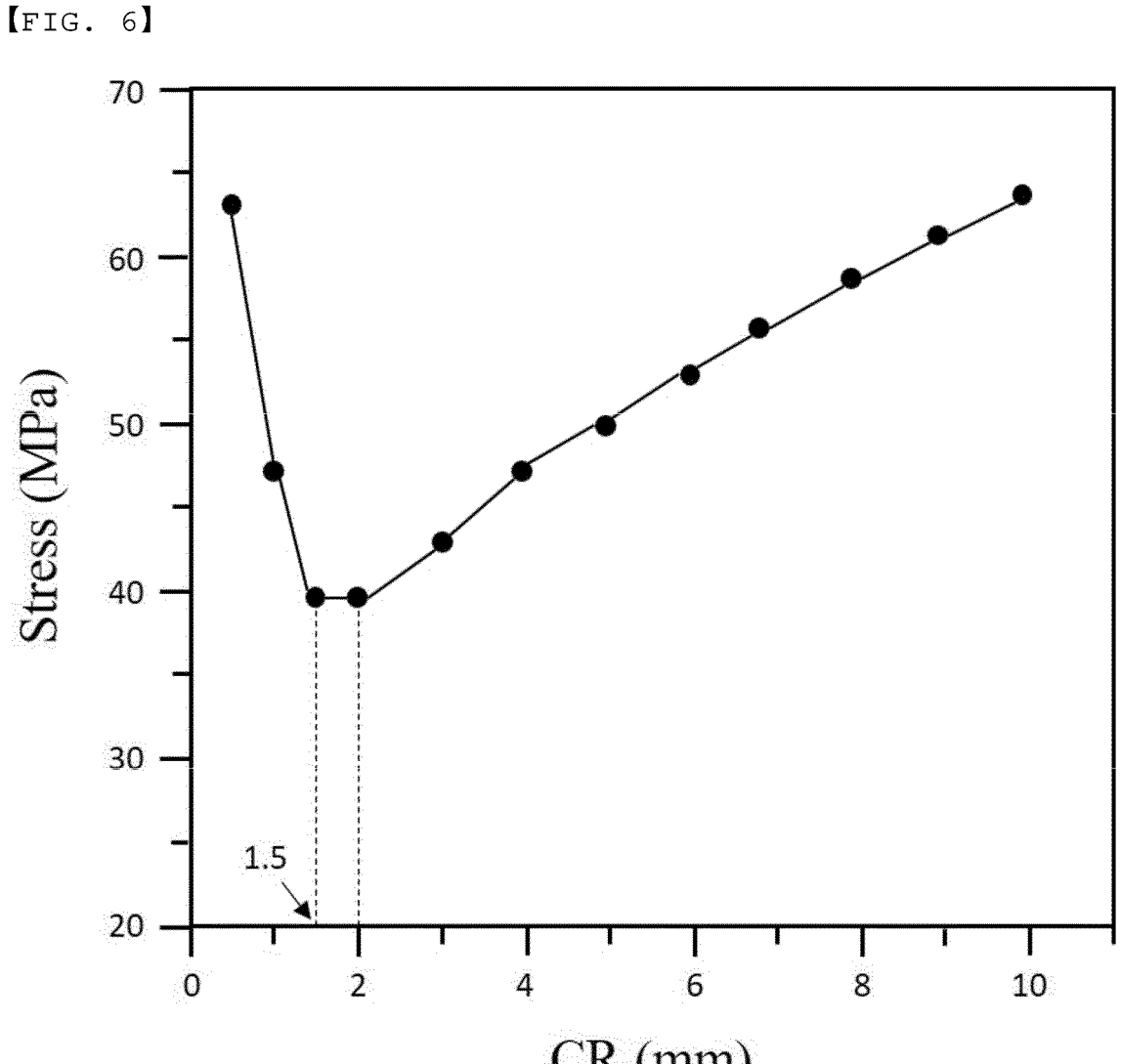

BATTERY CELL INCLUDING ELECTRODE TAB HAVING STRESS RELIEF PORTION

CROSS-REFERENCE TO RELATED APPLICATIONS

This application is a national stage entry under 35 U.S.C. § 371 of International Application No. PCT/KR2021/011360, filed on Aug. 25, 2021, which claims priority to Korean Patent Application No. 10-2020-0125806, filed on Sep. 28, 2020, the disclosures of which are hereby incorporated herein by reference in their entireties.

The present invention relates to a battery cell including an electrode tab having a stress relief portion capable of reducing stress generated in an electrode tab, thereby reducing a danger of the electrode tab being cut.

BACKGROUND ART

With technological development of mobile devices, such as smartphones, laptop computers, and digital cameras, and an increase in demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle (HEV), a plug-in hybrid electric vehicle (P-HEV), and an energy storage system (ESS).

There are a lithium ion battery, a lithium polymer battery, a nickel-cadmium battery, a nickel-hydride battery, and a nickel-zinc battery as secondary batteries that are widely used at present.

A secondary battery has an electrode assembly mounted in a battery case, and the electrode assembly is configured to have a structure in which a positive electrode plate, a separator, and a negative electrode plate are stacked and in which an electrode tab protrudes from each of the positive electrode plate and the negative electrode plate.

In addition, each of the positive electrode plate and the negative electrode plate is formed by applying an active material to a current collector made of metal foil. The electrode tab is formed by cutting the outer portion of the metal foil to which no active material is applied into a predetermined pattern, or may be joined to the metal foil by welding.

Stress is generated in the electrode tab due to internal force/external force applied to the electrode tab during manufacture or use of the secondary battery.

FIG. 1 is a schematic view showing a conventional electrode tab.

As shown in FIG. 1, the conventional electrode tab 10 includes a first tab portion 11 connected to an electrode plate 20 so as to protrude and extend from the electrode plate 20 and a second tab portion 12 extending from the first tab portion 11, the second tab portion being joined to an electrode lead.

Conventionally, the electrode tab is formed using a method of patterning a connection portion between the electrode tab and the electrode plate so as to have a right angle therebetween by cutting.

As a result, stress in the electrode tab is concentrated on the corner C of the connection portion between the electrode plate 20 and the electrode tab 10, and therefore a danger of the connection portion on which the stress is concentrated being cut is increased.

DISCLOSURE

Technical Problem

The present invention has been made in view of the above problems, and it is an object of the present invention to provide a battery cell including an electrode tab having a stress relief portion formed at one end thereof in order to reduce stress.

Technical Solution

In order to accomplish the above object, a battery cell according to the present invention includes an electrode assembly including a plurality of electrode plates and at least one separator interposed between the plurality of electrode plates, a case configured to receive the electrode assembly, electrode tabs formed at the electrode plates so as to protrude and extend therefrom, and an electrode lead joined to the electrode tabs while being electrically connected to the outside, wherein each of the electrode tabs includes a first tab portion connected to a corresponding one of the electrode plates and a second tab portion extending from the first tab portion, the electrode lead being joined to the second tab portion, and the first tab portion is provided with a stress relief portion configured to reduce stress in the electrode tab.

Also, in the battery cell according to the present invention, the stress relief portion may be a corner of a connection portion between the first tab portion and the electrode plate patterned so as to have a predetermined radius of curvature (R).

Also, in the battery cell according to the present invention, the stress relief portion may be a side surface of the first tab portion cut into the shape of an arc having a predetermined radius of curvature (CR).

Also, in the battery cell according to the present invention, a middle part of the first tab portion between the electrode plate and the second tab portion may have the minimum width.

Also, in the battery cell according to the present invention, the radius of curvature (CR) of the stress relief portion may be less than the length between the electrode plate and the second tab portion.

Also, in the battery cell according to the present invention, the electrode plates may include a positive electrode plate and a negative electrode plate, and each of the positive electrode plate and the negative electrode plate may be provided in the electrode assembly in plural.

Also, in the battery cell according to the present invention, the second tab portions may be formed by stacking the electrode tabs protruding and extending from the plurality of positive electrode plates or the plurality of negative electrode plates.

Also, in the battery cell according to the present invention, the electrode tabs protruding and extending from the positive electrode plates and the electrode tabs protruding and extending from the negative electrode plates may protrude in the same direction.

Also, in the battery cell according to the present invention, the electrode tabs protruding and extending from the positive electrode plates and the electrode tabs protruding and extending from the negative electrode plates may protrude in opposite directions.

Also, in the battery cell according to the present invention, the case may be a pouch-shaped case.

In addition, a battery module according to the present invention includes the battery cell according to the present invention.

In addition, a device according to the present invention includes the battery module according to the present invention.

Advantageous Effects

A battery cell according to the present invention has an advantage in that an electrode tab is provided with a stress relief portion, whereby stress generated in the electrode tab is reduced when external force is applied to the electrode tab, and therefore it is possible to reduce a danger of the electrode tab being cut.

DESCRIPTION OF DRAWINGS

FIG. 1 is a schematic view showing a conventional electrode tab.

FIG. 2 is a sectional view showing a portion of a battery cell according to an embodiment of the present invention.

FIG. 3 is a schematic view showing an electrode tab having a stress relief portion according to an embodiment of the present invention.

FIG. 4 is a schematic view showing an electrode tab having a stress relief portion according to another embodiment of the present invention.

FIG. 5 is a graph showing the relation between the radius of curvature of the stress relief portion of the electrode tab having the stress relief portion according to the embodiment of the present invention and the maximum value of stress.

FIG. 6 is a graph showing the relation between the radius of curvature of the stress relief portion of the electrode tab having the stress relief portion according to the other embodiment of the present invention and the maximum value of stress.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery cell according to the present invention will be described with reference to the accompanying drawings.

FIG. 2 is a sectional view showing a portion of a battery cell according to an embodiment of the present invention.

When describing the battery cell according to the present invention with reference to FIG. 2, the battery cell 100 according to the present invention includes an electrode assembly 110, a case 120 configured to receive the electrode assembly 110, electrode tabs 130, and an electrode lead 140.

First, the electrode assembly 110 is configured to have a structure in which a positive electrode plate, a separator, and a negative electrode plate are alternately stacked. Although a single positive electrode plate and a single negative electrode plate may be provided in the electrode assembly 110, it is preferable for a plurality of positive electrode plates and a plurality of negative electrode plates to be provided in the electrode assembly in consideration of the capacity of the battery cell 100.

Meanwhile, the electrode assembly 110 is classified as a jelly-roll type electrode assembly, which is configured to have a structure in which a long sheet type positive electrode plate having an active material applied thereto and a long sheet type negative electrode plate having an active material applied thereto are wound in the state in which a separator is interposed therebetween, a stacked type electrode assembly, which is configured to have a structure in which a plurality of positive electrode plates having a predetermined size and a plurality of negative electrode plates having a predetermined size are sequentially stacked in the state in which separators are interposed therebetween, or a stacked and folded type electrode assembly, which is configured to have a structure in which stacked type unit cells are wound using a separation film.

The case 120 is a sheathing member configured to receive the electrode assembly 110. Based on the shape of the case 120, the battery cell may be classified as a cylindrical battery cell having the electrode assembly 110 received in a cylindrical metal can, a prismatic battery cell having the electrode assembly 110 received in a prismatic metal can, or a pouch-shaped battery cell having the electrode assembly 110 received in a pouch-shaped case.

The pouch-shaped case is generally configured to have a laminate sheet structure including an inner layer, a metal layer, and an outer layer. The inner layer is disposed in direct contact with the electrode assembly, and therefore the inner layer must exhibit high insulation properties and high resistance to an electrolytic solution. In addition, the inner layer must exhibit high sealability in order to hermetically seal the case from the outside, i.e. a thermally-bonded sealed portion between inner layers must exhibit excellent thermal bonding strength.

The inner layer may be made of a material selected from among a polyolefin-based resin, such as polypropylene, polyethylene, polyethylene acrylate, or polybutylene, a polyurethane resin, and a polyimide resin, which exhibit excellent chemical resistance and high sealability. However, the present invention is not limited thereto, and polypropylene, which exhibits excellent mechanical-physical properties, such as tensile strength, rigidity, surface hardness, and impact resistance strength, and excellent chemical resistance, is the most preferably used.

The metal layer, which is disposed so as to abut the inner layer, corresponds to a barrier layer configured to prevent moisture or various kinds of gas from permeating into the battery from the outside. An aluminum thin film, which is light and easily shapeable, may be used as a preferred material for the metal layer.

The outer layer is provided on the other surface of the metal layer. The outer layer may be made of a heat-resistant polymer that exhibits excellent tensile strength, resistance to moisture permeation, and resistance to air permeation such that the outer layer exhibits high heat resistance and chemical resistance while protecting the electrode assembly. As an example, the outer layer may be made of nylon or polyethylene terephthalate. However, the present invention is not limited thereto.

FIG. 2 shows that the battery cell 100 is a pouch-shaped battery cell 100 having the electrode assembly received in a pouch-shaped case 120. However, the battery cell 100 according to the present invention is not limited thereto, and any type of battery cell 100 may be used as long as the battery cell 100 is configured such that the electrode tabs 130 protrude from the electrode plates.

In addition, the electrode lead 140 is electrically connected to the outside in a state of being joined to the electrode tabs. Various known welding methods, such as ultrasonic welding, resistance welding, and laser welding, may be used in order to join the electrode lead and the electrode tabs to each other.

FIG. 3 is a schematic view showing an electrode tab having a stress relief portion according to an embodiment of the present invention, and FIG. 4 is a schematic view showing an electrode tab having a stress relief portion according to another embodiment of the present invention.

When describing the electrode tab 130 according to the present invention in detail with reference to FIGS. 3 and 4, the electrode tab 130 includes a first tab portion 131a or 131b connected to an electrode plate 150 in a state of protruding and extending therefrom, a second tab portion 132a or 132b extending from the first tab portion 131a or 131b, the electrode lead 140 being joined to the second tab portion 132a or 132b, and a stress relief portion 133a or 133b configured to relieve stress applied to the electrode tab 130.

The electrode tabs 130 include positive electrode tabs protruding and extending from the positive electrode plates of the electrode assembly 110 and negative electrode tabs protruding and extending from the negative electrode plates of the electrode assembly. The positive electrode tabs and the negative electrode tabs are alternately stacked so as to be grouped by polarity. The stacked positive electrode tabs may be coupled to each other by ultrasonic welding, resistance welding, and laser welding, and the stacked negative electrode tabs may be coupled to each other by ultrasonic welding, resistance welding, and laser welding.

Here, the positive electrode tabs and the negative electrode tabs may protrude in the same direction, or may protrude in opposite directions.

In the case in which the positive electrode tabs and the negative electrode tabs protrude in the same direction, it is necessary for the positive electrode tabs and the negative electrode tabs to be located so as to avoid interference therebetween.

For example, in the case in which the positive electrode tabs are located so as to be biased to one side of the side surface of the electrode assembly from which the electrode tabs 130 protrude, it is preferable for the negative electrode tabs to be located so as to be biased to the other side of the side surface of the electrode assembly opposite the positive electrode tabs.

Meanwhile, in the case in which the positive electrode tabs and the negative electrode tabs protrude in opposite directions, the positive electrode tabs and the negative electrode tabs are generally located at the middles of the side surfaces of the electrode assembly from which the positive electrode tabs and the negative electrode tabs protrude, although the location of the positive electrode tabs and the negative electrode tabs is not particularly restricted.

In addition, the electrode tab 130 according to the present invention is provided with a stress relief portion 133 configured to reduce stress generated by internal force/external force applied to the electrode tab 130.

An example of the stress relief portion 133 is a stress relief portion 133a shown in FIG. 3.

The stress relief portion is formed by patterning the corner of a connection portion between the electrode plate 150 and the electrode tab 130, which has low resistance to stress generated in the electrode tab 130, so as not to have a right angle therebetween but to have a predetermined radius of curvature R therebetween. The stress relief portion serves to relieve stress concentrated on the corner of the connection portion.

FIG. 5 is a graph showing the relation between the radius of curvature of the stress relief portion of the electrode tab having the stress relief portion according to the embodiment of the present invention and the maximum value of stress.

The relation between the radius of curvature of the stress relief portion 133a and the maximum value of stress applied to the electrode tab 130 in the case in which the stress relief portion 133a is provided will be described with reference to FIG. 5. As the radius of curvature of the stress relief portion is approximately 4 mm, the maximum value of stress is decreased. When the radius of curvature of the stress relief portion is 4 mm, the maximum value of stress is the lowest. As the radius of curvature of the stress relief portion is greater than 4 mm, the maximum value of stress is increased.

That is, it can be seen that, when the radius of curvature R of the stress relief portion 133a is 4 mm, stress is the minimum.

FIG. 6 is a graph showing the relation between the radius of curvature of the stress relief portion of the electrode tab having the stress relief portion according to the other embodiment of the present invention and the maximum value of stress.

When describing the stress relief portion 133b with reference to FIGS. 4 and 6, the stress relief portion 133b is formed by cutting the side surface of the first tab portion 131b of the electrode tab 130 into the shape of an arc having a predetermined radius of curvature CR.

That is, the side surface of the first tab portion 131b is cut such that the width of the first tab portion 131b is the minimum at a middle part of the first tab portion.

In the case in which the side surface of the first tab portion 131b is cut (side-cut), as described above, it is possible to disperse stress concentrated on the corner of the connection portion between the electrode plate 150 and the electrode tab 130.

In consideration of the fact that mechanical strength of the first tab portion 131b and the amount of current that flows in the first tab portion are proportional to the area of a conductor, however, it is preferable for the side-cut depth of the side surface of the first tab portion 131b to be set such that the radius of curvature CR of the stress relief portion 133b is less than the length between the electrode plate and the second tab portion 132b.

In the relation between the radius of curvature CR of the stress relief portion 133b and the maximum value of stress, the maximum value of stress is the minimum when the radius of curvature CR is between 1.5 mm and 2 mm, and the maximum value of stress is increased as the radius of curvature CR is greater than 2 mm.

Meanwhile, when comparing the above two embodiments with each other, it can be seen that the maximum value of stress in the electrode tab 130 having the stress relief portion 133b formed by cutting the side surface of the first tab portion 131b into the shape of an arc having a predetermined radius of curvature CR is lower than in the other embodiment.

However, any one of the two kinds of stress relief portions 133*a* and 133*b* may be appropriately selected and applied to the electrode tab 130 in consideration of several conditions of an electrode assembly formation process or conditions necessary for a battery cell 100 to which the stress relief portion is to be applied.

As described above, it is possible to reduce stress generated in the electrode tab 130 by forming the stress relief portion 133, whereby it is possible to reduce a danger of the electrode tab 130 being cut.

In addition, it is possible to manufacture a battery module so as to include the battery cell 100 having the stress relief portion 133, and the battery module may be used as a power supply source for various devices.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

DESCRIPTION OF REFERENCE SYMBOLS

100: Battery cell
110: Electrode assembly
120: Case
130: Electrode tab
131, 131*a*, 131*b*: First tab portions
132, 132*a*, 132*b*: Second tab portions
133, 133*a*, 133*b*: Stress relief portions
140: Electrode lead
150: Electrode plate

The invention claimed is:

1. A battery cell, comprising:
an electrode assembly comprising a plurality of electrode plates and at least one separator interposed between the plurality of electrode plates;
a case receiving the electrode assembly therein;
electrode tabs extending from the electrode plates; and
an electrode lead joined to the electrode tabs extending to an outside of the case, wherein each of the electrode tabs comprises:
a first tab portion connected to a corresponding one of the electrode plates; and
a second tab portion extending from the first tab portion, the electrode lead being joined to the second tab portion, and
wherein the first tab portion has a stress relief portion configured to reduce stress in the electrode tab, and wherein the stress relief portion is an arc shaped corner at a connection portion extending between the first tab portion and the electrode plate, the arc shaped corner having a predetermined radius of curvature of 4 mm, and the arc shaped corner connecting tangentially in a first direction with a side of the electrode plate and tangentially in a second direction with a side of the first tab portion, wherein the first direction and second direction are not parallel.

2. The battery cell according to claim 1, wherein the electrode plates comprise a plurality of positive electrode plates and a plurality of negative electrode plates.

3. The battery cell according to claim 2, wherein the second tab portions extend from the plurality of positive electrode plates or the plurality of negative electrode plates.

4. The battery cell according to claim 3, wherein the electrode tabs extending from the plurality of positive electrode plates and the electrode tabs extending from the plurality of negative electrode plates protrude in an identical direction.

5. The battery cell according to claim 3, wherein the electrode tabs extending from the plurality of positive electrode plates and the electrode tabs extending from the plurality of negative electrode plates protrude in opposite directions.

6. The battery cell according to claim 1, wherein the case is a pouch-shaped case.

7. A battery module comprising the battery cell according to claim 1.

8. A device comprising the battery module according to claim 7.

9. A battery cell, comprising:
an electrode assembly comprising a plurality of electrode plates and at least one separator interposed between the plurality of electrode plates;
a case receiving the electrode assembly therein;
electrode tabs extending from the electrode plates; and
an electrode lead joined to the electrode tabs extending to an outside of the case, wherein each of the electrode tabs comprises:
a first tab portion connected to a corresponding one of the electrode plates; and
a second tab portion extending from the first tab portion, the electrode lead being joined to the second tab portion, and
wherein the first tab portion has a stress relief portion configured to reduce stress in the electrode tab and wherein the stress relief portion is a side surface of the first tab portion having an arc shape having a predetermined radius of curvature from 1.5 mm to 2 mm.

10. The battery cell according to claim 9, wherein a middle part of the first tab portion extending between the electrode plate and the second tab portion has a minimum width that is less than widths of the electrode plate and the second tab portion.

11. The battery cell according to claim 9, wherein the radius of curvature of the stress relief portion is less than a distance between the electrode plate and the second tab portion.

12. The battery cell according to claim 9, wherein the electrode plates comprise a plurality of positive electrode plates and a plurality of negative electrode plates.

13. The battery cell according to claim 12, wherein the second tab portions extend from the plurality of positive electrode plates or the plurality of negative electrode plates.

14. The battery cell according to claim 13, wherein the electrode tabs extending from the plurality of positive electrode plates and the electrode tabs extending from the plurality of negative electrode plates protrude in an identical direction.

15. The battery cell according to claim 13, wherein the electrode tabs extending from the plurality of positive electrode plates and the electrode tabs extending from the plurality of negative electrode plates protrude in opposite directions.

16. The battery cell according to claim 9, wherein the case is a pouch-shaped case.

17. A battery module comprising the battery cell according to claim 9.

18. A device comprising the battery module according to claim 17.

\* \* \* \* \*